US008860910B2

(12) United States Patent
Chen et al.

(10) Patent No.: US 8,860,910 B2
(45) Date of Patent: Oct. 14, 2014

(54) BACKLIGHT MODULE AND DISPLAY APPARATUS

(71) Applicants: Shih Hsiang Chen, Guangdong (CN); Li-Yi Chen, Guangdong (CN); Dehua Li, Guangdong (CN); Guofu Tang, Guangdong (CN)

(72) Inventors: Shih Hsiang Chen, Guangdong (CN); Li-Yi Chen, Guangdong (CN); Dehua Li, Guangdong (CN); Guofu Tang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 154 days.

(21) Appl. No.: 13/703,937

(22) PCT Filed: Nov. 22, 2012

(86) PCT No.: PCT/CN2012/085017
§ 371 (c)(1),
(2), (4) Date: Dec. 13, 2012

(87) PCT Pub. No.: WO2014/067192
PCT Pub. Date: May 8, 2014

(65) Prior Publication Data
US 2014/0125919 A1 May 8, 2014

(30) Foreign Application Priority Data

Nov. 2, 2012 (CN) .......................... 2012 1 0433166

(51) Int. Cl.
*G02F 1/1335* (2006.01)
*F21V 8/00* (2006.01)

(52) U.S. Cl.
CPC .................................. *G02B 6/0028* (2013.01)
USPC ................ 349/65; 362/561; 362/610; 385/49

(58) Field of Classification Search
CPC .............. G02F 1/133615; G02F 2001/133618; G02B 6/0013
USPC ........ 349/65; 362/610, 561; 385/49, 900, 901
See application file for complete search history.

(56) References Cited

U.S. PATENT DOCUMENTS

| 5,283,563 | A * | 2/1994 | Allen et al. ..................... 349/77 |
| 2002/0076162 | A1 * | 6/2002 | Crafts .............................. 385/49 |
| 2002/0176035 | A1 * | 11/2002 | Yamazaki ....................... 349/61 |

FOREIGN PATENT DOCUMENTS

| CN | 1629690 A | 6/2005 |
| CN | 101174027 A | 5/2008 |
| CN | 201081152 Y | 7/2008 |
| CN | 201449474 U | 5/2010 |
| CN | 101782698 A | 7/2010 |
| CN | 102073166 A | 5/2011 |
| CN | 102193247 A | 9/2011 |
| CN | 102494279 A | 6/2012 |

* cited by examiner

*Primary Examiner* — Michael Caley
(74) *Attorney, Agent, or Firm* — Kirton McConkie; Evan R. Witt

(57) ABSTRACT

The present invention provides a backlight module and a display apparatus. The display apparatus comprises the backlight module and a display panel. The backlight module comprises a light collector, at least one optical fiber bundle, a fiber light-outputting substrate, a light guide plate and a fiber holding plate. The optical fiber bundle is connected between the light collector and the fiber light-outputting substrate. The light guide plate is disposed at one side of the fiber light-outputting substrate, and the fiber holding plate is configured to hold optical fibers of the optical fiber bundle. The present invention can use ambient light rays to form a backlight source.

17 Claims, 7 Drawing Sheets

BACKLIGHT MODULE AND DISPLAY APPARATUS

FIELD OF THE INVENTION

The present invention relates to a backlight module and a display apparatus, and more particularly to a backlight module and a display apparatus using ambient light rays.

BACKGROUND OF THE INVENTION

Liquid crystal displays (LCDs) have been widely applied in electrical products. Currently, most LCDs are backlight type LCDs that comprise a liquid crystal display panel and a backlight module. According to the position of the light sources for providing LCDs with backlight, the backlight module can be classified into a side-light type or a direct-light type to provide a backlight for the liquid crystal display panel.

In general, light sources of the backlight module are light emitting diodes (LEDs) or cold cathode fluorescent lamps (CCFLs) which need phosphors to form white light rays which have a poorer color performance and a narrower color gamut, and thus it is difficult to achieve a real color of images. Furthermore, the light sources of the backlight module have a high energy consumption, especially for a large-size LCD.

As a result, it is necessary to provide a backlight module and a display apparatus to solve the problems existing in conventional technologies such as above-mentioned.

SUMMARY OF THE INVENTION

A primary object of the present invention is to provide a backlight module, wherein the backlight module comprises: a light collector configured to collect ambient light rays; at least one optical fiber bundle connected to the light collector, wherein the optical fiber bundle comprises a plurality of optical fibers; a fiber light-outputting substrate connected to the optical fibers of the optical fiber bundle, wherein the fiber light-outputting substrate includes a plurality of light-outputting openings configured to output the light rays transmitted by the optical fibers; a light guide plate disposed at one side of the fiber light-outputting substrate; and a fiber holding plate disposed between the optical fiber bundle and the fiber light-outputting substrate for holding the optical fibers of the optical fiber bundle, wherein the fiber holding plate includes at least one fiber separation member, and the fiber separation member has a plurality of recessions for receiving and holding the optical fibers.

A secondary object of the present invention is to provide a backlight module, wherein the backlight module comprises: a light collector configured to collect ambient light rays; at least one optical fiber bundle connected to the light collector, wherein the optical fiber bundle comprises a plurality of optical fibers; a fiber light-outputting substrate connected to the optical fibers of the optical fiber bundle, wherein the fiber light-outputting substrate includes a plurality of light-outputting openings configured to output the light rays transmitted by the optical fibers; a light guide plate disposed at one side of the fiber light-outputting substrate; and a fiber holding plate disposed between the optical fiber bundle and the fiber light-outputting substrate for holding the optical fibers of the optical fiber bundle, wherein the fiber holding plate includes at least one fiber separation member, and the fiber separation member has a plurality of recessions for receiving and holding the optical fibers, and the fiber separation member is made of a soft material; wherein the at least one fiber separation member comprises a first fiber separation member and a second fiber separation member, and the second fiber separation member is disposed between the first fiber separation member and the fiber light-outputting substrate.

A further object of the present invention is to provide a display apparatus, wherein the display apparatus comprises a display panel and a backlight module. The backlight module comprises: a light collector configured to collect ambient light rays; at least one optical fiber bundle connected to the light collector, wherein the optical fiber bundle comprises a plurality of optical fibers; a fiber light-outputting substrate connected to the optical fibers of the optical fiber bundle, wherein the fiber light-outputting substrate includes a plurality of light-outputting openings configured to output the light rays transmitted by the optical fibers; a light guide plate disposed at one side of the fiber light-outputting substrate; and a fiber holding plate disposed between the optical fiber bundle and the fiber light-outputting substrate for holding the optical fibers of the optical fiber bundle, wherein the fiber holding plate includes at least one fiber separation member, and the fiber separation member has a plurality of recessions for receiving and holding the optical fibers.

In one embodiment of the present invention, the at least one fiber separation member comprises a first fiber separation member and a second fiber separation member, and the second fiber separation member is disposed between the first fiber separation member and the fiber light-outputting substrate.

In one embodiment of the present invention, a length of the second fiber separation member is longer than a length of the first fiber separation member.

In one embodiment of the present invention, the first fiber separation member has a plurality of first recessions, and the second fiber separation member has a plurality of second recessions, and an arrangement pitch of the second recessions is larger than an arrangement pitch of the first recessions.

In one embodiment of the present invention, the fiber separation member is made of a soft material.

In one embodiment of the present invention, the recessions are arranged in a fan-shaped manner.

In one embodiment of the present invention, the fiber holding plate further includes at least one adjustment groove, and a bottom protrusion of the fiber separation member is fitted into the adjustment groove.

In one embodiment of the present invention, the light collector includes a base and an optical lens, and the optical lens is disposed on the base.

In one embodiment of the present invention, the ambient light rays are sunlight rays.

In comparison to the problems existing in the conventional backlight module, the backlight module and the display apparatus of the present invention can use the ambient light rays to form the backlight source, thereby greatly reducing an energy consumption of light sources. Moreover, the ambient light can have a wide color gamut, and thus the display apparatus using the backlight module of the present invention can display images of real color for improving a display quality thereof. Furthermore, the fiber holding plate of the backlight module can efficiently hold and position the optical fibers of the optical fiber bundle for ensuring the light transmitting efficiency of the optical fibers.

The structure and the technical means adopted by the present invention to achieve the above-mentioned and other objects can be best understood by referring to the following detailed description of the preferred embodiments and the accompanying drawings:

DETAILED DESCRIPTION OF THE PREFERRED EMBODIMENTS

Figure 1:
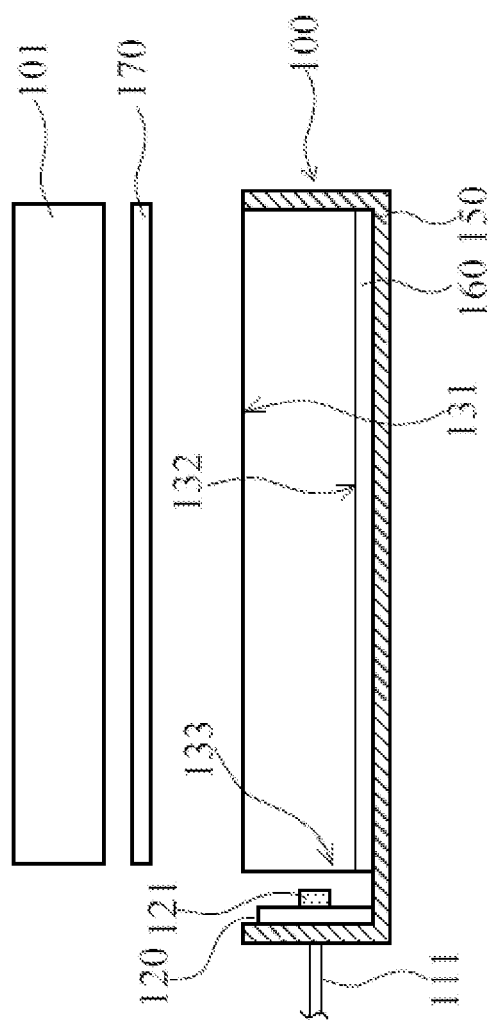
FIG. 1 is a schematic diagram showing a display apparatus according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Figure 2:
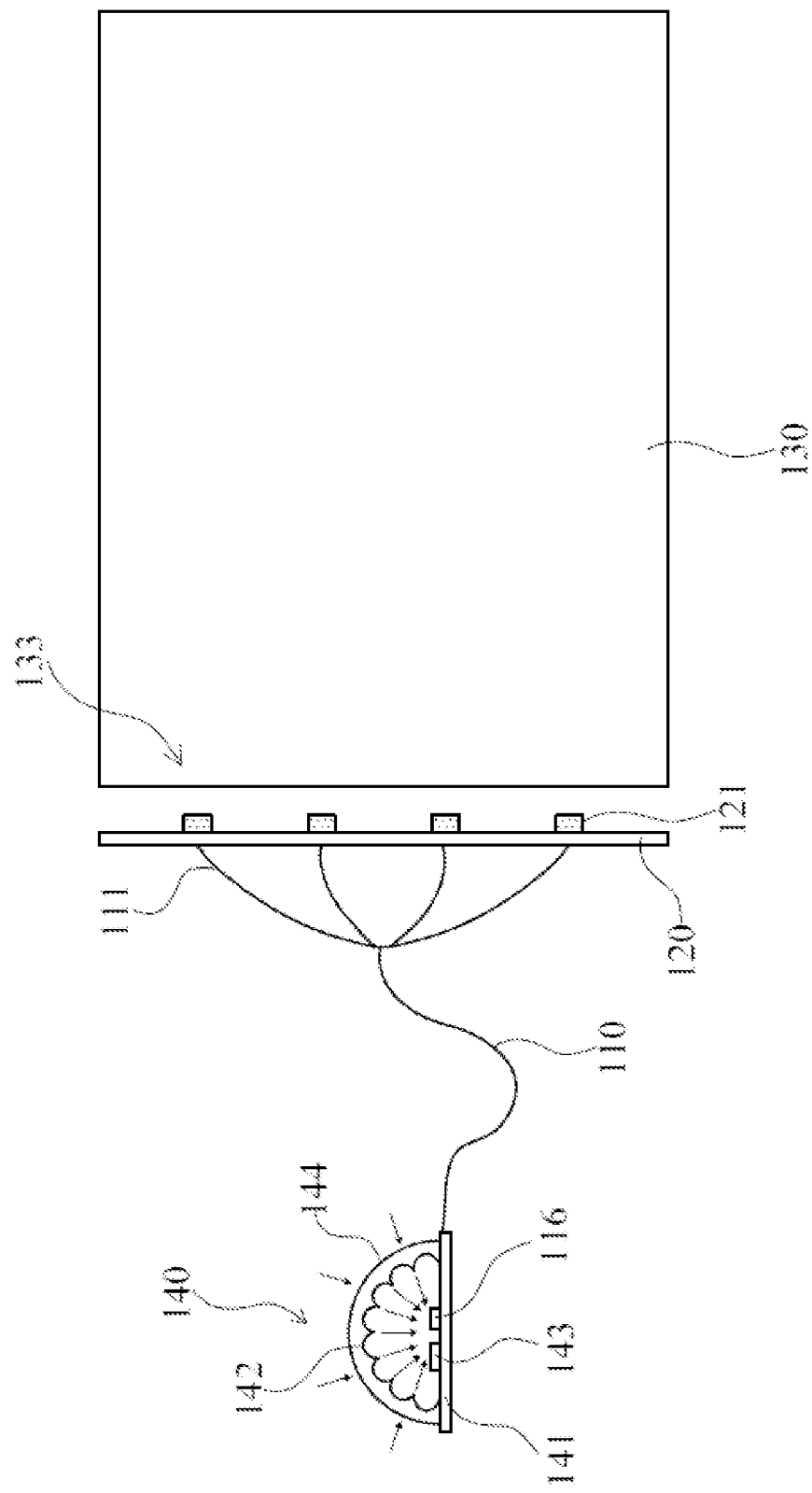
FIG. 2 is a schematic diagram showing a backlight module according to one embodiment of the present invention.

Referring to FIG. 1 and FIG. 2, FIG. 1 is a schematic diagram showing a display apparatus according to one embodiment of the present invention, and FIG. 2 is a schematic diagram showing a backlight module according to one embodiment of the present invention. In the present embodiment, the backlight module 100 is disposed opposite to a display panel 101 (such as a liquid crystal display panel), thereby forming the display apparatus (such as an LCD apparatus). The backlight module 100 comprises at least one optical fiber bundle 110, a fiber light-outputting substrate 120, a light guide plate 130, a light collector 140, a back bezel 150, a reflective layer 160, at least one optical film 170 and a fiber holding plate 180. The optical fiber bundle 110 is connected to the light collector 140 and comprises a plurality of optical fibers 111 for transmitting light rays. The fiber light-outputting substrate 120 is disposed between the optical fibers 111 and the light guide plate 130 for outputting the light rays transmitted by the optical fibers 111 to the light guide plate 130. The light collector 140 is connected to the optical fiber bundle 110 for collecting ambient light rays, such as sunlight or indoor light, so as to provide the light rays for the optical fiber bundle 110. The light guide plate 130 is disposed on the back bezel 150, and the reflective layer 160 is formed between the back bezel 150 and the light guide plate 130 for reflecting the light rays. The optical film 170 is disposed above the light guide plate 130 for optical improvement. The fiber holding plate 180 is disposed between the optical fiber bundle 110 and the fiber light-outputting substrate 120 for holding the optical fibers 111 of the optical fiber bundle 110.

Referring to FIG. 2 again, the optical fibers 111 of the optical fiber bundle 110 of the present embodiment can be bundled by a cover. One end of the optical fiber bundle 110 is connected to the light collector 140, and the un-bundled optical fibers 111 are connected to the fiber light-outputting substrate 120 and held on the fiber holding plate 180.

Figure 3:
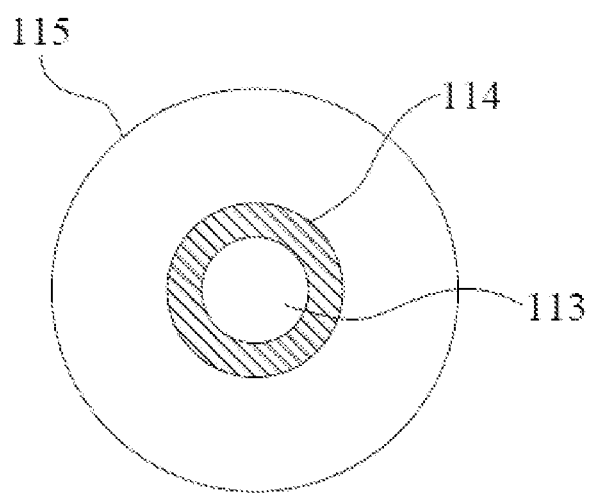
FIG. 3 is a schematic diagram showing the optical fiber according to one embodiment of the present invention.

Referring to FIG. 3, a schematic diagram showing the optical fiber according to one embodiment of the present invention is illustrated. Each of the optical fibers 111 of the present embodiment may have a fiber core 113, a cladding layer 114 and a buffer layer 115. The fiber core 113 may be made of silica or PMMA for transmitting the light rays. The cladding layer 114 may be made of a hard polymer for cladding the fiber core 113. The buffer layer 115 may be made of tetrafluoroethene for protecting the optical fibers 111 from damage.

Referring to FIG. 1 and FIG. 2 again, the fiber light-outputting substrate 120 is disposed between the optical fiber bundle 110 and the light guide plate 130 for outputting the light rays transmitted by the optical fibers 111 of the optical fiber bundle 110. The fiber light-outputting substrate 120 comprises a plurality of light-outputting openings 121 for exposing the optical fibers 111 of the optical fiber bundle 110, such that the light rays transmitted by the optical fibers 111 can be outputted to the light guide plate 130 by the light-outputting openings 121 of the fiber light-outputting substrate 120. In this case, an arrangement pitch of the light-outputting openings 121 may be equal to or less than 16 mm, so as to ensure that the light rays are dispersedly emitted into the light guide plate 130 for forming a uniform plane light source. A diameter (or a width) of each of the light-outputting openings 121 may be equal to or less than 2.5 mm, such that the light rays transmitted by the optical fibers 111 can be entirely outputted by the light-outputting openings 121.

Referring to FIG. 1 again, the light guide plate 130 of the present embodiment is disposed at one side of the fiber light-outputting substrate 120. The light guide plate 130 may be made by the method of injection molding, and the material thereof may be photo-curable resin, polymethylmethacrylate (PMMA) or polycarbonate (PC) for guiding the light rays transmitted by the optical fibers 111 toward the liquid crystal display panel 101. The light guide plate 130 includes a light output surface 131, a light reflection surface 132 and a light input side surface 133. The light output surface 131 is formed on one side of the light guide plate 130 and faces to the liquid crystal display panel 101. The light output surface 131 may include a cloudy surface or a plurality of scattering patterns to uniform the light rays outputted from the light guide plate 130, thereby preventing the situation of mura. In another embodiment, the light output surface 131 may include a plurality of protruding structures (not shown) to modify the direction of the light rays, thereby condensing the light rays and enhancing a brightness thereof, wherein the protruding structures may be prism-shaped structures or semicircle-shaped structures. The light reflection surface 132 is formed opposite to the light output surface 131 for reflecting light thereto. In the present embodiment, the light reflection surface 132 of the light guide plate 130 is parallel to the light output surface 131. The light reflection surface 132 may have a plurality of light guiding structures (not shown) formed thereon to guide light to the light output surface 131. The light guiding structures of the light reflection surface 132 may be a continuous V-shaped structure, i.e. V-cut structures, a cloudy surface or scattering patterns, thereby guiding the light rays transmitted by the optical fibers 111 to be outputted from the light output surface 131. The light input side surface 133 may be formed on one side or two opposite sides of the light guide plate 130 and facing the light-outputting openings 121 of the fiber light-outputting substrate 120 for allowing the light rays transmitted by the optical fibers 111 to be inputted into the light guide plate 130. The light input side surface 133 may have V-shaped structures (V-cut structures), S-shaped structures or a rough surface structure (not shown) to raise light incidence efficiency and light coupling efficiency.

Referring to FIG. 2 again, the light collector 140 can be disposed outside the display apparatus (such as outdoors or indoors) and connected to one end of the optical fiber bundle 110 for collecting the ambient light, such as sunlight. The light collector 140 can include a base 141, an optical lens 142, a photo-sensor 143 and a cover 144. The optical lens 142 and the photo-sensor 143 can be disposed on the base 141. The optical lens 142 is configured to collect the ambient light and provide the collected light rays to an input end 116 of the optical fiber bundle 110. The photo-sensor 143 is configured to detect the ambient light for controlling the base 141 to rotate according an ambient light source, such as sun, thereby improving a light collection efficiency. The cover 144 is configured to encapsulate the optical lens 142 and the photo-sensor 143. Furthermore, the cover 144 may have an ultraviolet ray filter layer (not shown) to filter ultraviolet rays in the ambient light rays.

Referring to FIG. 1 again, in the present embodiment, the back bezel 150 may be made of an opaque material, such as plastic, metal or any combination material thereof for carrying the fiber light-outputting substrate 120 and the light guide plate 130, wherein the back bezel 150 may have through holes (not shown) to allow the optical fibers 111 to pass through. The reflective layer 160 (or a reflective sheet) is preferably formed on the light reflection surface 132 of the light guide plate 130, and merely exposes the light input side surface 133 for allowing light to be inputted and the light output surface 131 allowing light to be outputted. The reflective layer 160 may be made of a highly reflective material, such as any combination of alloys Ag, Al, Au, Cr, Cu, In, Ir, Ni, Pt, Re, Rh, Sn, Ta, W, Mn, and a white reflective paint with etiolation-resistant and heat-resistant properties or any combination thereof for reflecting light. The optical film 170 may be a diffuser, a prism sheet, a turning prism sheet, a brightness enhancement film (BEF), a dual brightness enhancement film (DBEF), a diffused reflective polarizer film (DRPF) or any combination thereof disposed above the light guide plate 130 for improving an optical effect of light rays outputted from the light guide plate 130.

Figure 4:
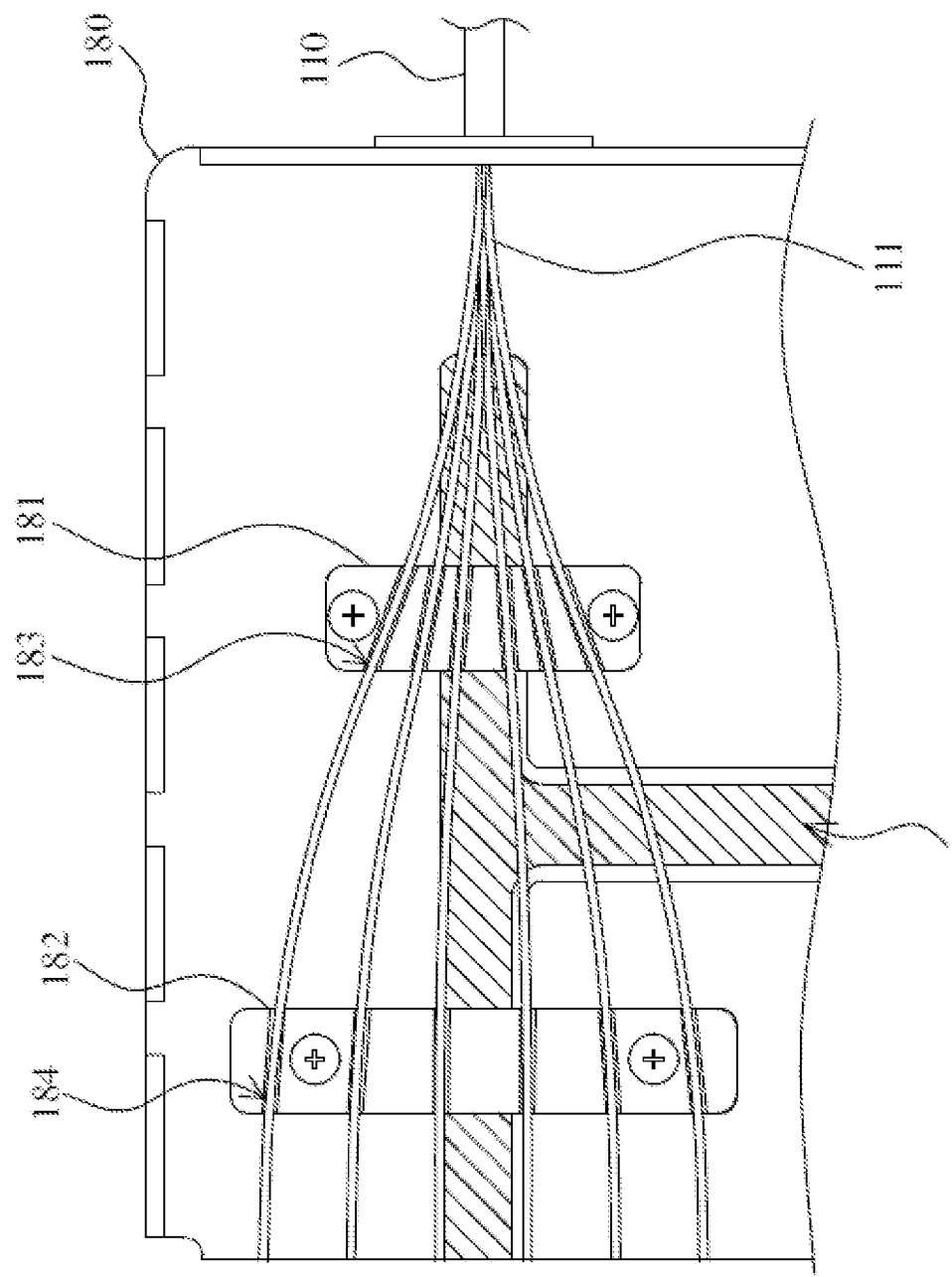
FIG. 4 is a schematic diagram showing the optical fibers and the fiber holding plate according to one embodiment of the present invention.
Figure 5:
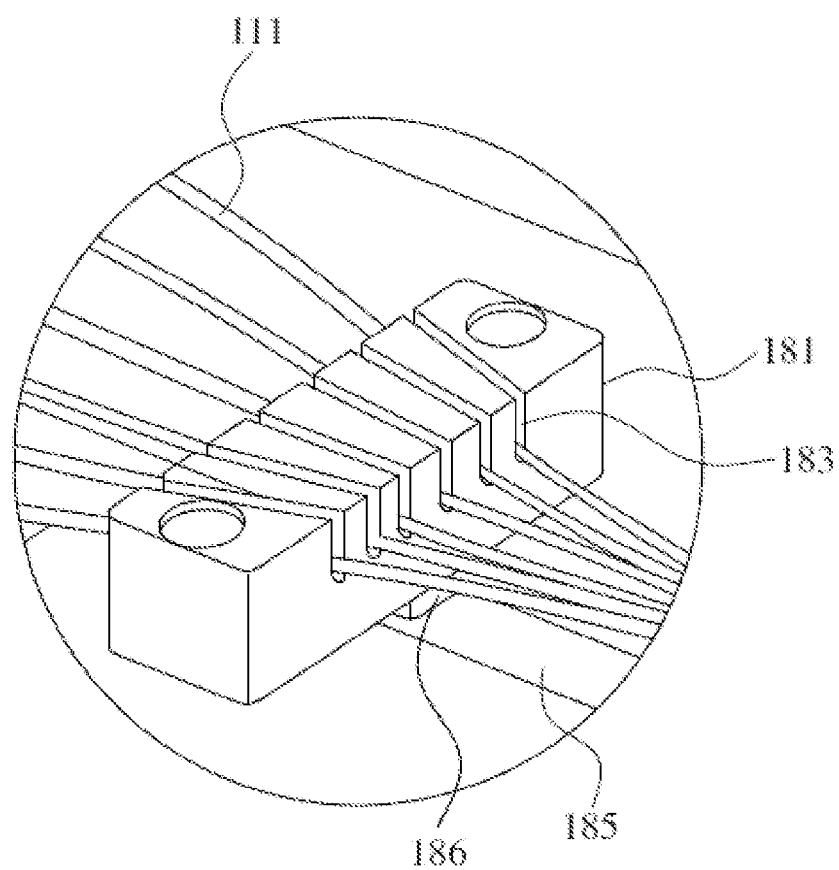
FIG. 5 is an enlarged view showing a fiber separation member according to one embodiment of the present invention.
Figure 6:
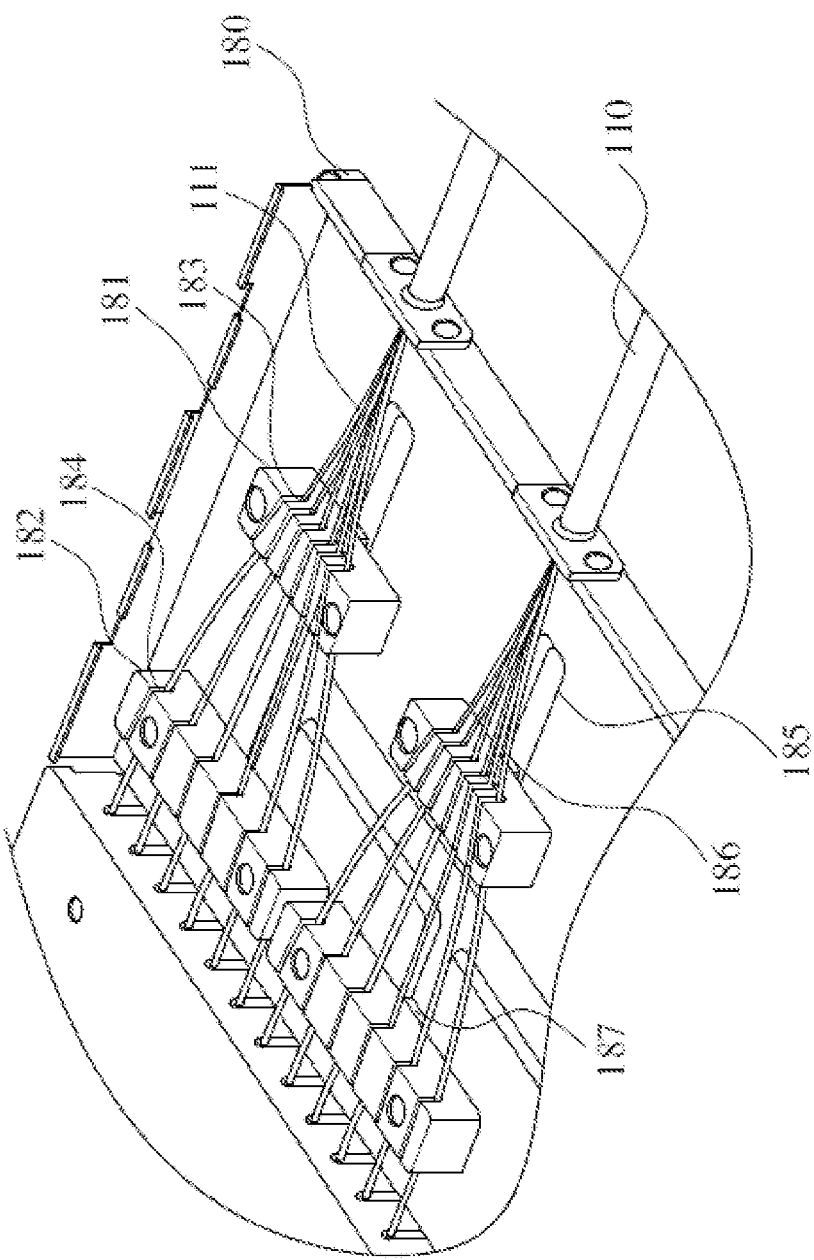
FIG. 6 is a partially perspective view showing the optical fibers and the fiber holding plate according to one embodiment of the present invention.

Referring to FIG. 4 through FIG. 6, FIG. 4 is a schematic diagram showing the optical fibers and the fiber holding plate according to one embodiment of the present invention, and FIG. 5 is an enlarged view showing a fiber separation member according to one embodiment of the present invention, and FIG. 6 is a partially perspective view showing the optical fibers and the fiber holding plate according to one embodiment of the present invention. A plate body of the fiber holding plate 180 of the present embodiment may be made of a plastic or metal material, and the fiber holding plate 180 comprises a first fiber separation member 181 and a second fiber separation member 182 which are disposed according to the optical fibers 111, and the second fiber separation member 182 is disposed between the first fiber separation member 181 and the fiber light-outputting substrate 120. The first fiber separation member 181 and the second fiber separation member 182 may be made of a plastic or metal material, and preferably made of a soft material, such as silica gel or rubber, so as to prevent the optical fibers 111 of the optical fiber bundle 110 from scratches or any damage. The first fiber separation member 181 has a plurality of first recessions 183, and the second fiber separation member 182 has a plurality of second recessions 184, and the first recessions 183 and the second recessions 184 are configured to receive and hold the optical fibers 111 of the of the optical fiber bundle 110, such that the optical fibers 111 can be positioned and secured on the fiber holding plate 180, and arranged in a fan-shaped manner. In this case, the first recessions 183 can be arranged in the fan-shaped manner, and a length of the second fiber separation member 182 can be longer than a length of the first fiber separation member 181, and an arrangement pitch of the second recessions 184 can be larger than an arrangement pitch of the first recessions 183, such that the optical fibers 111 secured in the recessions 183, 184 can be arranged in the fan-shaped manner. Therefore, with the use of the fiber holding plate 180, the optical fibers 111 of the optical fiber bundle 110 can be pre-arranged thereon, so as to prevent the optical fibers 111 from being bent, thereby ensuring a light transmitting efficiency of the optical fibers 111.

Referring to FIG. 6 again, the fiber holding plate 180 of the present embodiment can further include at least one adjustment groove 185, and a bottom protrusion 186 of the first fiber separation member 181 and a bottom protrusion 187 of the second fiber separation member 182 can be fitted into the at least one adjustment groove 185. Therefore, positions of the first fiber separation member 181 and the second fiber separation member 182 on the fiber holding plate 180 can adjusted with the use of the at least one adjustment groove 185, and the first fiber separation member 181 and the second fiber separation member 182 and be fixed on the fiber holding plate 180 by, for example, screwing after position adjustment.

When using the backlight module of the present embodiment to provide a backlight source, the optical fibers 111 of the optical fiber bundle 110 can transmit the light rays (such as sunlight) collected by the light collector 140 to the light guide plate 130. More specifically, the light rays collected by the light collector 140 can be transmitted by the optical fibers 111 of the optical fiber bundle 110, and outputted to the light guide plate 130 from the light-outputting openings 121 of the fiber light-outputting substrate 120. The backlight module 100 can use the ambient light to provide the backlight source, thereby greatly reducing an energy consumption of light sources. Moreover, the ambient light (such as sunlight) can have a wide color gamut, and thus the display apparatus using the backlight module 100 can display images of real color for improving a display quality thereof. In addition, with the use of the fiber holding plate 180, the optical fibers 111 of the optical fiber bundle 110 can be pre-arranged and secured in the fan-shaped manner, so as to prevent the optical fibers 111 from being bent, thereby ensuring a light transmitting efficiency of the optical fibers 111.

Figure 7:
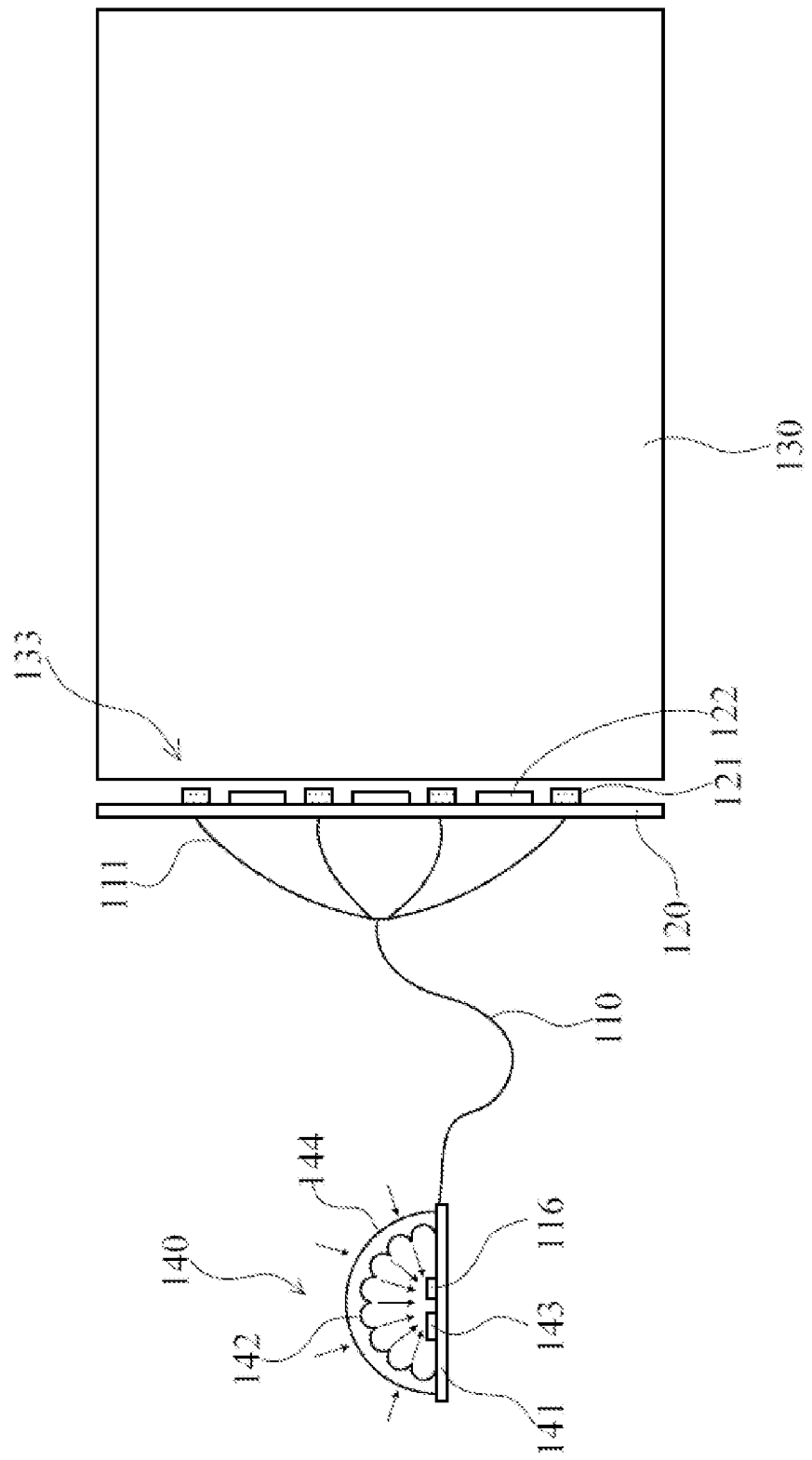
FIG. 7 is a schematic diagram showing a backlight module according to another embodiment of the present invention.

Referring to FIG. 7, a schematic diagram showing a backlight module according to another embodiment of the present invention is illustrated. In another embodiment, the fiber light-outputting substrate 120 may comprise a plurality of light sources 122, such as LEDs or organic light emitting diodes (OLEDs). The light sources 122 may be arranged between the light-outputting openings 121 and facing the light input side surface 133 of the light guide plate 130. When the light rays collected by the light collector 140 are not sufficient for forming the plane light source, the light sources 122 can provide additional light rays for the light guide plate 130, so as to ensure that the backlight formed by the backlight module 100 has a sufficient brightness.

As described above, the backlight module and the display apparatus of the present invention can collect the ambient light rays to form the backlight source, thereby greatly reducing an energy consumption of light sources, as well as improving an image color performance and a display quality of the display apparatus. Furthermore, the fiber holding plate of the backlight module can efficiently hold and position the optical fibers of the optical fiber bundle for ensuring the light transmitting efficiency of the optical fibers.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
 a light collector configured to collect ambient light rays;
 at least one optical fiber bundle connected to the light collector, wherein the optical fiber bundle comprises a plurality of optical fibers;
 a fiber light-outputting substrate connected to the optical fibers of the optical fiber bundle, wherein the fiber light-outputting substrate includes a plurality of light-outputting openings configured to output the light rays transmitted by the optical fibers;
 a light guide plate disposed at one side of the fiber light-outputting substrate; and
 a fiber holding plate disposed between the optical fiber bundle and the fiber light-outputting substrate for holding the optical fibers of the optical fiber bundle, wherein the fiber holding plate includes at least one fiber separation member, and the fiber separation member has a plurality of recessions for receiving and holding the optical fibers, and the fiber separation member is made of a soft material;
 wherein the at least one fiber separation member comprises a first fiber separation member and a second fiber separation member, and the second fiber separation member is disposed between the first fiber separation member and the fiber light-outputting substrate.

2. The backlight module according to claim 1, wherein a length of the second fiber separation member is longer than a length of the first fiber separation member.

3. The backlight module according to claim 1, wherein the first fiber separation member has a plurality of first recessions, and the second fiber separation member has a plurality of second recessions, and an arrangement pitch of the second recessions is larger than an arrangement pitch of the first recessions.

4. The backlight module according to claim 1, wherein the recessions are arranged in a fan-shaped manner.

5. The backlight module according to claim 1, wherein the fiber holding plate further includes at least one adjustment groove, and a bottom protrusion of the fiber separation member is fitted into the adjustment groove.

6. The backlight module according to claim 1, wherein the light collector includes a base and an optical lens, and the optical lens is disposed on the base.

7. The backlight module according to claim 1, wherein the ambient light rays are sunlight rays.

8. A backlight module, comprising:
 a light collector configured to collect ambient light rays;
 at least one optical fiber bundle connected to the light collector, wherein the optical fiber bundle comprises a plurality of optical fibers;
 a fiber light-outputting substrate connected to the optical fibers of the optical fiber bundle, wherein the fiber light-outputting substrate includes a plurality of light-outputting openings configured to output the light rays transmitted by the optical fibers;
 a light guide plate disposed at one side of the fiber light-outputting substrate; and
 a fiber holding plate disposed between the optical fiber bundle and the fiber light-outputting substrate for holding the optical fibers of the optical fiber bundle, wherein the fiber holding plate includes at least one fiber separation member, and the fiber separation member has a plurality of recessions for receiving and holding the optical fibers.

9. The backlight module according to claim 8, wherein the at least one fiber separation member comprises a first fiber separation member and a second fiber separation member, and the second fiber separation member is disposed between the first fiber separation member and the fiber light-outputting substrate.

10. The backlight module according to claim 9, wherein a length of the second fiber separation member is longer than a length of the first fiber separation member.

11. The backlight module according to claim 9, wherein the first fiber separation member has a plurality of first recessions, and the second fiber separation member has a plurality of second recessions, and an arrangement pitch of the second recessions is larger than an arrangement pitch of the first recessions.

12. The backlight module according to claim 8, wherein the fiber separation member is made of a soft material.

13. The backlight module according to claim 8, wherein the recessions are arranged in a fan-shaped manner.

14. The backlight module according to claim 8, wherein the fiber holding plate further includes at least one adjustment groove, and a bottom protrusion of the fiber separation member is fitted into the adjustment groove.

15. The backlight module according to claim 8, wherein the light collector includes a base and an optical lens, and the optical lens is disposed on the base.

16. The backlight module according to claim 8, wherein the ambient light rays are sunlight rays.

17. A display apparatus, comprising:
 a display panel; and
 a backlight module comprising:
  a light collector configured to collect ambient light rays;
  at least one optical fiber bundle connected to the light collector, wherein the optical fiber bundle comprises a plurality of optical fibers;
  a fiber light-outputting substrate connected to the optical fibers of the optical fiber bundle, wherein the fiber light-outputting substrate includes a plurality of light-outputting openings configured to output the light rays transmitted by the optical fibers;
  a light guide plate disposed at one side of the fiber light-outputting substrate; and
  a fiber holding plate disposed between the optical fiber bundle and the fiber light-outputting substrate for holding the optical fibers of the optical fiber bundle, wherein the fiber holding plate includes at least one fiber separation member, and the fiber separation member has a plurality of recessions for receiving and holding the optical fibers.

* * * * *